United States Patent [19]

Ishida et al.

[11] Patent Number: 5,437,787
[45] Date of Patent: Aug. 1, 1995

[54] ADSORPTION/REACTION EQUIPMENT

[75] Inventors: Hiroshi Ishida; Kiyoshi Izumi, Osaka, Japan; Shuzo Matsumura, London, United Kingdom

[73] Assignee: Kubota Corporation, Osaka, Japan; a part interest

[21] Appl. No.: 164,395

[22] Filed: Dec. 9, 1993

[30] Foreign Application Priority Data

Dec. 24, 1992 [JP] Japan .................. 4-342964

[51] Int. Cl.⁶ .................. B01D 15/02; B01D 61/58
[52] U.S. Cl. .................. 210/189; 210/256; 210/266; 210/269; 210/274; 210/321.84
[58] Field of Search ............... 210/189, 266, 269, 256, 210/258, 259, 260, 274, 295, 319, 321.6, 321.84

[56] References Cited

U.S. PATENT DOCUMENTS 5,141,719  8/1992  Fernwood et al. ............ 210/323.1

FOREIGN PATENT DOCUMENTS

| 0154334 | 9/1985 | European Pat. Off. . |
| 0228782 | 7/1987 | European Pat. Off. . |
| 0433200 | 6/1991 | European Pat. Off. . |
| 0510328 | 10/1992 | European Pat. Off. . |
| 2628337 | 9/1989 | France . |
| 2127323 | 7/1970 | Germany . |

*Primary Examiner*—Ivars Cintins
*Attorney, Agent, or Firm*—Barnes, Kisselle, Raisch, Choate, Whittemore & Hulbert

[57] ABSTRACT

A filtration device 5 is provided in the state being submerged in slurry comprising adsorbent component stored in a reaction tank 1. The filtration device 5 incorporates a plurality of filtering-membrane elements 8 each comprising a filtering membrane 10 having less than 0.1 μm of through-hole diameter. These filtering-membrane elements 8 are vertically disposed in parallel with each other at predetermined intervals between surfaces of adjoining filtering membranes 10. A suction pump 14 is provided by way of linkage with the filtering-membrane elements 8 via a suction tube 13 for sucking processed liquid. A gas-dispersing device 16 is disposed below the filtering-membrane elements 8. A blower 18 is provided in linkage with the gas-dispersing device 16 via a blowing duct 17. An adsorbent regeneration apparatus 21 and an adsorbent feeding pump 22 are respectively interposed on the halfway of an adsorbent circulation duct 20. As a result of the provision of the filtering membranes 10 for the filtering-membrane elements 8, extremely fine adsorbent particles can perfectly be separated without using precoating agent at all. And yet, as a result of the introduction of extremely fine adsorbent particles, the whole structure of the adsorption and reaction equipment can be built compactly. In particular, the invented equipment can continuously regenerate the spent adsorbent component.

2 Claims, 2 Drawing Sheets

ADSORPTION/REACTION EQUIPMENT

FIELD OF THE INVENTION

The present invention relates to an adsorption/reaction equipment which provides filtration device to effect discoloration, deodorization, and purification by means of adsorbent, catalyzer, and ion-exchange resin.

BACKGROUND OF THE INVENTION

In order to eliminate impurities from raw liquid while executing discoloration, deodorization, and purification processes, conventionally, adsorption and reaction processes with activated charcoal, oxidation process with catalyzer, and ion-exchange reaction with ion-exchange resin, are respectively executed. Typically, a contact filtration equipment is used to eliminate impurities from raw liquid by applying adsorbent, catalyzer, and ion-exchange resin. This conventional filtration equipment adsorbs impurities by initially mixing pulverized adsorbent component with raw liquid followed by a stirring process to generate suspension. When absorption reaches equilibrium, treated liquid is separated from adsorbent component via a filtration process. Whenever applying adsorbent comprising fine particles, a precoat filtration device is used to separate the treated liquid from adsorbent component. In this case, initially, auxiliary precoating agent such as diatomaceous earth is precoated on the filtration device to separate the treated liquid from adsorbent component.

When operating the above-cited conventional filtration device, the finer the particle size of the adsorbent, the faster the adsorption and greater the absorptive capacity. Nevertheless, because of difficulty to fully separate treated liquid from adsorbent component, there is a certain limit in regard to the minimizable range of particle size of usable adsorbent. Furthermore, while using the precoat filtration device to separate treated liquid from ultra-fine adsorbent, auxiliary precoating component adhered to adsorbent component inhibits the main adsorbent component from being regenerated, and therefore, once-used adsorbent is compulsorily discarded as useless waste blended with auxiliary precoating agent.

DISCLOSURE OF THE INVENTION

Therefore, the object of the invention is to fully solve the above problems by providing a novel adsorption/reaction equipment capable of using extremely fine particles of adsorbent and regenerating the spent adsorbent component cyclically.

To achieve the above object, the novel adsorption and reaction equipment according to the invention comprises the following; a reaction tank which provides raw liquid supply tube and pools adsorbent component in slurry condition therein; a membrane filtration device which is disposed in the reaction tank by way of being submerged in adsorbent pooled therein in slurry condition; a plurality of filtering-membrane elements each having a filtering membrane respectively being disposed inside of the casing of the membrane separation device in the vertical direction by way of being in parallel with and properly spaced between surfaces of filtering membranes of adjoining filtering membrane elements; a suction pump linked with the filtering membrane elements via a suction tube for sucking processed liquid; a gas supply unit disposed below the filtering membrane elements inside of the casing of the membrane filtration device; and a blower linked with the gas supply unit via a gas duct.

According to the structure described above, gas used for stirring pooled raw liquid and adsorbent in slurry condition is supplied to the gas supply unit from the blower via the gas duct in order to disperse gas in the upward direction via the gas supply unit. As a result, upward flows are generated along the membrane surface by aerial lifting action of dispersed gas used for agitation. After arriving at the top domain of the reaction tank via adjoining filtering membrane elements, the adsorbent slurry starts to flow in the downward direction between inner wall surfaces of the reaction tank and the membrane filtration device, thus generating circulation flow inside of the reaction tank. Because of this circulation flow, slurry comprising raw liquid and adsorbent component remains in the state of suspension to accelerate adsorbent component to come into contact with impurities in raw liquid to fully remove them via membrane filtration.

On the other hand, the suction pump sucks up treated liquid from the reaction tank via the filtering membrane elements. While these processes are under way, since through-hole diameter of the filtering membrane of each filtering membrane element corresponds to diameter of individual fine particle of adsorbent, all the fine adsorbent particles are perfectly separated without applying precoating agent at all. Furthermore, fine adsorbent particles deposited on the membrane surfaces of the filtering membrane elements are sweeping away from the membrane surfaces by effect of tangential bubble flows passing through interspace between adjoining filtering membrane elements.

Therefore, since the adsorbent component can be perfectly separated from treated liquid by the filtering membranes without applying precoating agent, the filtration system according to the invention can regenerate the spent fine adsorbent particles. Since ultra-fine adsorbent can be used in adsorption/reaction equipment, the adsorption rate and capacity can respectively be accelerated. This in turn permits materialization of a down-sized adsorption/reaction equipment.

To embody a better structure, the adsorption/reaction equipment according to the invention further provides a tubular duct for circulating the adsorbent component slurry via the reaction tank as a means for embodying a circulating system. An adsorbent regenerating unit and an adsorbent supply pump are interposed on the halfway of the adsorbent circulating tubular duct.

According to the improved structure described above, slurry containing the spent adsorbent component is discharged from the reaction tank via the adsorbent circulating tubular duct, and then, after regenerating the adsorbent component by operating the adsorbent regenerating apparatus, the regenerated adsorbent component is sent back to the reaction tank via the adsorbent supply pump.

As a result, the adsorption and reaction equipment according to the invention can cyclically regenerate and recycle the spent adsorbent component in the system. And yet, since the adsorption and reaction system of the invention uses adsorbent comprising extremely fine particles, the retention time thus permitting the invented system to continuously discharge and regenerate the spent adsorbent component.

DESCRIPTION OF THE PREFERRED EMBODIMENTS

Referring now to the accompanying drawings, full aspects of the adsorption and reaction equipment according to an embodiment of the invention are described below.

Figure 1:
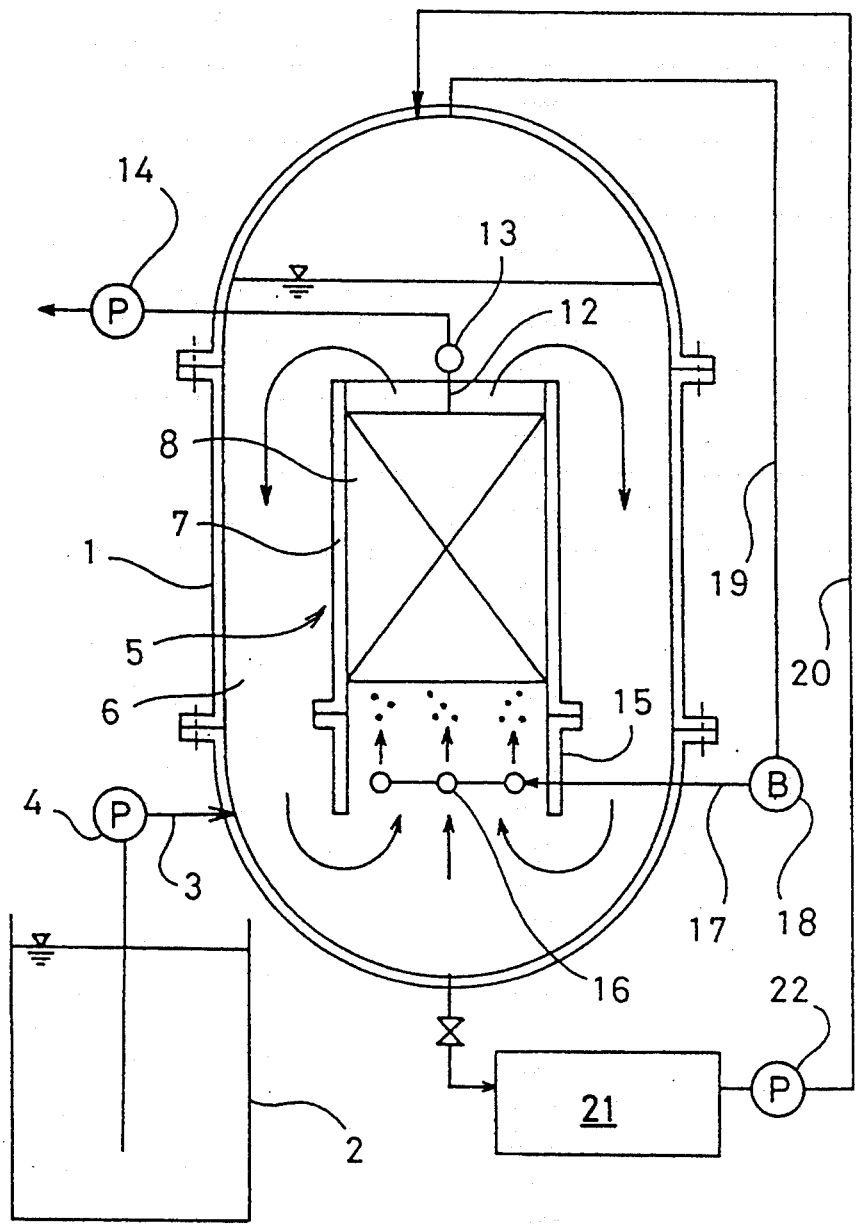
FIG. 1 is an overall block diagram of the adsorption/reaction equipment according to an embodiment of the invention.
Figure 2:
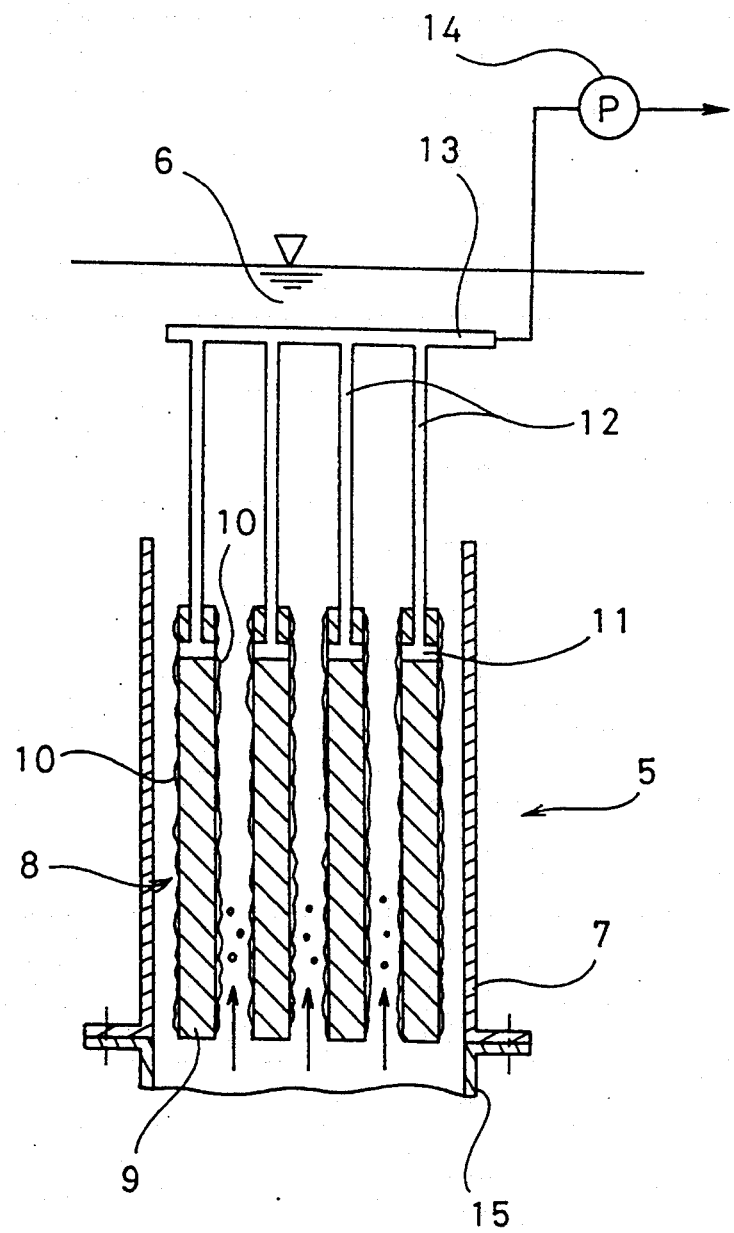
FIG. 2 is a cross-sectional view of main components of the membrane filtration device according to the above embodiment of the invention.

A fully-sealed reaction tank 1 shown in FIGS. 1 and 2 internally pools slurry containing adsorbent comprising extremely fine particles. Fine particles of ion-exchange resin, or pulverized activated charcoal, or fine particles of zeolite, or fine particles of catalyzer, can be used for the adsorbent component. Particle size of the adsorbent component can be reduced as fine as possible by reducing diameter of through-holes of filtering membranes to be described later on. Practically, particle size of adsorbent component can be reduced to 0.05 $\mu$m.

A raw liquid supply tube 3 having an end linked with a raw liquid reservoir 2 is connected to a side-wall of the reaction tank 1. A raw liquid pump 4 is interposed on the halfway of the supply tube 3. A membrane filtration device 5 is disposed in the reaction tank 1, where the membrane filtration device 5 is submerged in slurry 6 containing adsorbent component. A plurality of filtering-membrane elements 8 are disposed in parallel with each other in the vertical direction inside of a casing 7 of the membrane filtration device 5 at properly determined intervals ranging from 6 mm to 10 mm between surfaces of adjoining filtering membranes 10. Each of the filtering-membrane elements 8 has a membrane-supporting plate 9, where the filtering membranes 10 each comprising either an ultra-filtering membrane or a micro-filtering membrane are set to both-side lateral surfaces of the membrane-supporting member 9. Each filtering membrane 10 has a plurality of extremely fine through-holes each having less than 0.1 $\mu$m of diameter. A passage 11 for filtrate is provided for each membrane-supporting member 9 of each filtering membrane element 8, where the passages 11 are conjunctionally linked with a tube 13 for sucking filtrate via a routed tube 12. A filtrate suction pump 14 is interposed on the halfway of the filtrate sucking tube 13. A gas-dispersing device 16 is disposed in a lower-casing 15 of the membrane filtration device 5 at a predetermined position below the assembly of the filtering-membrane elements 8. The gas-dispersing device 16 is linked with a blower 18 via a duct 17, where the Gas-intake side of the blower 18 is connected to the tip of the reaction tank 1 via an air intake tube 19. An open end of an adsorbent circulating tube 20 is linked with the bottom of the reaction tank 1. An adsorbent regeneration apparatus 21 and an adsorbent suction pump 22 are respectively interposed on the halfway of the adsorbent circulating tube 20. An adsorbent circulation system is formed by combining the reaction tank 1, the adsorbent circulating tube 20, the adsorbent regenerating apparatus 21, and the adsorbent suction pump 22, with each other.

According to the above embodiment of the invention, the raw liquid pump 4 continuously feeds raw liquid from the raw liquid reservoir 2 to the reaction tank 1 via the raw liquid supply tube 3, and then, slurry 6 is formed by fine adsorbent particles pooled in the reaction tank 1 and raw liquid. The blower 18 sucks exhausted gas via the gas-intake tube 19. Alternatively, fresh air may be fed as the object of reaction. The exhausted gas is then sent back to the gas-dispersing device 16 via the blowing duct 17 for generating agitation. The gas-dispersing device 16 blows off the sent back gas upward to cause agitation to occur.

Flow of gas dispersed upward for generating agitation causes aerial lifting action to take place, which then generates tangential flow of the slurry 6 containing adsorbent along surfaces of respective filtering membranes 10 of the filtering membrane elements 8. Upon arrival at the tip of the reaction tank 1 via interspace between the adjoining filtering membrane elements 8, the slurry then turns downward through inter-space between the inner wall surface of the reaction tank 1 and the membrane filtration device 5 before eventually generating circulating flow in the reaction tank 1. While maintaining the slurry 6 comprising adsorbent component and raw liquid in the state of suspension in the reaction tank 1, availing of the circulating flow, the treated liquid in contact with the adsorbent is conjunctionally separated from the adsorbent.

On the other hand, the suction pump 14 sucks the treated liquid 6 via the filtering membrane elements 8 to cause each of the filtering membranes 10 to separate the treated liquid from the adsorbent. On the way of adsorbing and filtering the processed liquid, since each filtering membrane 10 of the filtering membrane elements 8 has less than 0.1 $\mu$m of through-hole diameter, even though the adsorbent comprises extremely fine particles, fine adsorbent particles can perfectly be separated without using precoating agent at all. Furthermore, the adsorbent component deposited to surfaces of the filtering membrane elements 8 is sweeping away therefrom by effect of tangential aerial flow passing through interspace between respective membrane surfaces.

Therefore, the adsorption and reaction equipment embodied by the invention securely separates the treated liquid from adsorbent component via filtering membranes 10 without applying precoating agent at all. As a result, the inventive system can securely regenerate the spent fine adsorbent particles during an adsorption/reaction process. Furthermore, since the inventive system can use adsorbent as of the fine-particle state, adsorption rate and adsorption capacity can be accelerated to enable materialization of down-sizing of the whole structure of the adsorption and reaction equipment.

According to the invention, the spent adsorbent component is discharged from the bottom of the reaction tank 1 via the adsorbent circulating tube 20, and then, after regenerating the spent adsorbent component via the adsorbent regenerating apparatus 21, the regenerated adsorbent component is sent back to the reaction tank 1 via the adsorbent suction pump 22.

In contrast with any of the conventional filtration devices, discharging spent adsorbent component based on a batch operation before sending it to an independent process to regenerate or totally discarding it as useless waste, the adsorption and reaction system according to the invention regenerate and recycle the spent adsorbent. In particular, since the equipment according to the invention can execute adsorption process very fast as a result of the introduction of extremely fine adsorbent particles, the improved filtration system according to the invention can reduce the retention time of adsorbent component in the reaction tank 1, and therefore, the invented system can regenerate the spent adsorbent component on the continuous basis.

What is claimed is:

1. An adsorption/reaction equipment comprising;

a reaction tank (1) which receives inflow of raw liquid subject to a purification process through a supply tube (3), an adsorbent component pooled in said reaction tank and comprising fine particles of predetermined diameter in slurry condition;

a filtration device (5) which is disposed inside of said reaction tank (1) and is submerged in said slurry of adsorbent pooled therein;

a plurality of filtering membrane elements (8) each incorporating a filtering membrane (10) having a through-hole diameter wherein said elements (8) are disposed in parallel with each other in the vertical direction inside of a casing (7) of said filtration device (5) at predetermined intervals between surfaces of adjoining filtering membranes (10);

a suction pump (14) which is connected to said filtering membrane elements (8) by a suction tube (13) for sucking processed liquid;

a gas-dispersing device (16) disposed below said filtering membrane elements (8) inside of said casing (7);

a blower (18) connected to said gas-dispersing device (16) by a blowing duct (17), an adsorbent-regenerating equipment (21) and an adsorbent-supply pump (22) respectively being interposed in an adsorbent circulating duct (20) that forms a circulatory system with said reaction tank (1).

2. The adsorption/reaction equipment as defined in claim 1, wherein the trough-hole diameter of each membrane (10) is less than 0.1 $\mu$m.

* * * * *